(12) United States Patent
Uehara et al.

(10) Patent No.: US 6,284,156 B1
(45) Date of Patent: Sep. 4, 2001

(54) LONG-LASTING PHOSPHOR, POWDERED LONG-LASTING PHOSPHOR AND METHOD FOR MANUFACTURING THE POWDERED LONG-LASTING PHOSPHOR

(75) Inventors: Susumu Uehara, Sagamihara; Yasuo Ochi, Kunitachi, both of (JP)

(73) Assignee: Kabushiki Kaisha Ohara, Sagamihara (JP)

( * ) Notice: Subject to any disclaimer, the term of this patent is extended or adjusted under 35 U.S.C. 154(b) by 0 days.

(21) Appl. No.: 09/439,002

(22) Filed: Nov. 12, 1999

(30) Foreign Application Priority Data

Nov. 19, 1998 (JP) .................................. 10-329287

(51) Int. Cl.$^7$ .................................. C09K 11/08
(52) U.S. Cl. .......................... 252/301.4 F; 252/301.4 R; 252/301.6 R
(58) Field of Search .................. 252/301.4 F, 301.4 R, 252/301.6 R

(56) References Cited

U.S. PATENT DOCUMENTS

| | | | |
|---|---|---|---|
| 3,668,455 | * | 6/1972 | Dale et al. .................... 252/301.4 R |
| 5,770,111 | * | 6/1998 | Moriyama et al. .......... 252/301.4 R |
| 6,010,644 | * | 1/2000 | Fu et al. ....................... 252/301.4 R |
| 6,117,362 | * | 9/2000 | Yen et al. ..................... 252/301.4 R |

FOREIGN PATENT DOCUMENTS

98/37165 * 8/1998 (WO) .

OTHER PUBLICATIONS

Abstract for JP 2000212556, Aug. 2, 2000.*

* cited by examiner

*Primary Examiner*—C. Melissa Koslow
(74) *Attorney, Agent, or Firm*—Hedman & Costigan, P.C.

(57) ABSTRACT

There is provided a long-lasting phosphor having a base crystal of åkermanite crystal structure consisting of R' (where R' is one or more elements selected from the group consisting of Ca, Sr and Ba), Mg, Si, O and N and comprising Eu as an activator and one or more co-activators such as Dy. The long-lasting phosphor is produced by sintering materials including strontium nitrate to grow the base crystal of åkermanite crystal structure, or by changing a solution containing constituent elements or material in the state of suspension into fine particles of liquid by atomization and thereafter heating the fine particles of liquid in a gas stream under oxidating, neutral or reducing atmosphere. The new Mohs' scale of hardness of the long-lasting phosphor is less than 1. Phosphorescence brightness of the long-lasting phosphor 2 minutes after stoppage of irradiation of illuminance of 1000 lux for 30 minutes with a white fluorescent lamp is 200 mCd/m$^2$ or over.

19 Claims, 3 Drawing Sheets

LONG-LASTING PHOSPHOR, POWDERED LONG-LASTING PHOSPHOR AND METHOD FOR MANUFACTURING THE POWDERED LONG-LASTING PHOSPHOR

BACKGROUND OF THE INVENTION

This invention relates to a long-lasting phosphor, a powdered long-lasting phosphor and a method for manufacturing the powdered long-lasting phosphor.

Fluorescence is a phenomenon that a material emits visible ray when excited by an excitation source applied from outside. A fluorescent lamp, a discharge tube and a cathode ray tube utilize fluorescence. A material which emits fluorescence is called a phosphor. When light emitted by a phosphor lasts after stoppage of excitation for duration of time sufficient for the light to be perceived by the eye, i.e., about 0.1 second or longer, the light is called phosphorescence. A phosphor which has a long persistent phosphorescence lasting for several hours at room temperature is called a long-lasting phosphor or a light storage phosphor.

As such long-lasting phosphors, known in the art are sulfides and oxides. Main long-lasting phosphor products used in the past have been those having a sulfide such as ZnS:Cu as their base crystal. They however are disadvantageous in that their after-glow lasts for a relatively short duration of time, i.e., about three hours at the longest. Since a decomposition reaction of $ZnS+H_2O \rightarrow Zn+H_2S$ takes place under the coexistence of ultraviolet ray contained in the sunlight and moisture contained in the air, the phosphor becomes black and, as a result, the after-glow characteristics significantly deteriorate within a relatively short period of time. For this reason, this type of phosphor has only limited applications such as a luminous watch and a night-time display of a location in a house.

In addition to these long-lasting phosphors, there have recently been developed alkaline earth metal aluminate long-lasting phosphors having alkaline earth metal aluminate as their base crystal and comprising divalent europium as an activator and one or more rare earth elements as a co-activator (Japanese Patent No. 2543825 and Japanese Patent No. 2697688). By normally adding phosphoric acid or boric acid as a flux, these long-lasting phosphors exhibit phosphorescence brightness and lifetime which are about ten times as large as the sulfide type long-lasting phosphors. These long-lasting phosphors, however, become a hard mass by the use of such flux with resulting difficulty in crushing the long-lasting phosphors. In practice, a long-lasting phosphor is often crushed to powder and used as a powdered material mixed with resin, glass, ink or ceramics material. Therefore, in the course of crushing by a powerful crusher, crushing media are mixed as impurities which become obstacles at the light absorbing and light emitting time. Thus, these long-lasting phosphors are disadvantageous in the difficulty in crushing.

Further, when these long lasting phosphors are dispersed in an aqueous solution, pH of the aqueous solution becomes strongly alkaline and, as a result, dispersion of particles of the long-lasting phosphors becomes insufficient which changes physical properties such as viscosity of the aqueous solution. This poses a serious problem, for example, in the manufacture of inks.

These alkaline earth metal aluminate long-lasting phosphors are generally manufactured by sintering of mixed powdered materials at a high temperature. More specifically, highly pure materials such as oxides, carbonates and nitrates are crushed and mixed with a ball mill and then sintered in a reducing atmosphere such as hydrogen gas. Alkaline earth metal aluminate long-lasting phosphor obtained by the sintering is then crushed to particles of a predetermined particle diameter. In some case, the crushed long-lasting phosphor is rinsed and dried for removing flux which has been added for improving the sintering efficiency. Lastly, the crushed particles are classified to provide a product required.

The alkaline earth metal aluminate long-lasting phosphor thus produced has a wide distribution of particle diameter, since it is produced through the crushing process. This results in irregularity in the shape of particles of the product and, besides, contains a significant amount of fine powdery particles which have been produced during the crushing process.

For overcoming this disadvantage of the alkaline earth metal aluminate long-lasting phosphors, an alkaline earth metal silicate (Sr—Mg—Si—O:Eu.Ln) long-lasting phosphor has been developed. Japanese Patent Application Laid-open Publication No. Hei 9-194833 discloses that an alkaline earth metal silicate long-lasting phosphor added with a small amount of Dy as a co-activator exhibits high phosphorescence brightness and long life and, if halogen is added further, exhibits higher phosphorescence brightness and longer life. This long-lasting phosphor is excellent in phosphorescence brightness, life, chemical durability and resistance to light. When, however, this long-lasting phosphor is manufactured by using halogen, halogen gas which is known as a poisonous gas is generated and this is undesirable.

PCT/CN97/00143 Publication discloses an alkaline earth metal silicate long-lasting phosphor which is added with boric acid or phosphoric acid as a flux. Generation of a poisonous gas can be avoided by this method but the sintered product produced by this method becomes a mass which is as hard as the above described alkaline earth metal aluminate long-lasting phosphors and therefore leave the problem discussed above.

Phosphorescence characteristics, particularly phosphorescence brightness, of these recently developed alkaline earth metal aluminate or silicate long-lasting phosphors are influenced by their composition and particle diameter. As to the particle diameter, there is the tendency that, if the particle diameter becomes smaller than 100 μm, phosphorescence brightness decreases proportionally. The mechanism of this phenomenon is not known, though it is conceivable that the crystalline state of the particle surface of long-lasting phosphor is deteriorated due to collapse or distortion of the crystal lattice caused by crushing and, as a result, the state of electrons about europium is deviated from a proper state resulting in deterioration in the functions of excitation and light emission or, alternatively, it is not the surface layer of each particle but the bulk itself that contributes to emission of light and, as the particle diameter decreases, the ratio of the surface layer relatively increases which results in deterioration in the phosphorescence brightness. In any case, it is an established fact that decrease in the particle diameter results in decrease in phosphorescence brightness and, accordingly, if it is desired to obtain an alkaline earth metal aluminate or silicate long-lasting phosphor having high phosphorescence brightness, consideration must be given not only to the composition but also to the particle diameter and distribution of particle diameter.

Further, when characteristics required for a pigment are considered, the shape of the particle in addition to the particle diameter and distribution of particle diameter must be taken into consideration. Particularly, mixing of fine powdery particles and increase in the relative surface area due to an irregular particle shape cause insufficient dispersion of the pigment and increase in the amount of oil absorbed whereas mixing of coarse particles cause insufficient dispersion and reduction in coloring and concealing characteristics of the pigment.

Additionally, these alkaline earth metal aluminate or silicate long-lasting phosphors have the following problems:
(1) Since materials before sintering are mixture of powdered materials in the form of mixture of solids, it is difficult to mix the respective ingredients uniformly.
(2) In the course of mixing materials, impurities from mixing media are mixed which adversely affects emission characteristics of the long-lasting phosphors. Particularly, in the course of crushing process after sintering also, the emission characteristics are deteriorated due to mixing of impurities from the crushing media.
(3) The long-lasting phosphors obtained by crushing have a wide particle diameter distribution and therefore classification is necessary for obtaining particles of a desired average particle diameter. This complicates the manufacturing process. Moreover, fine powdery particles are deposited onto the surface of coarse particles and such fine powdery particles cannot be removed by classification, it becomes difficult to obtain a desired degree of particle. Furthermore, since fine powdery particles which have low light emission intensity cover the surface of coarse particles, the light emission intensity as a whole is also reduced.

It is, therefore, an object of the invention to provide a long-lasting phosphor which has a narrow particle diameter distribution, contains as little fine powdery particles as possible, exhibits no decrease in phosphorescence brightness due to mixing and crushing, has a particle shape which is suitable as a pigment and is uniform at the molecular level without requiring a complicated process as in the above described general manufacturing method.

It is another object of the invention to provide a novel alkaline earth metal aluminate or alkaline earth metal silicate long-lasting phosphor in which no poisonous gas is produced during manufacturing of a sintered long-lasting phosphor, and the sintered mass can be easily crushed and which is excited efficiently by the sunlight or fluorescent lamp of day-light color, and has high phosphorescence brightness and long life.

SUMMARY OF THE INVENTION

For achieving the above described object of the invention, the inventors of the present invention have conducted studies and experiments and found, which has led to the present invention, that, by a sintering process using strontium nitrate as a raw material of Sr, a long-lasting phosphor having an alkaline earth metal aluminate crystal structure or an alkaline earth metal silicate crystal structure as its base crystal which has excellent phosphorescence characteristics and is very fragile can be obtained and that phosphorescence brightness of this long-lasting phosphor is not decreased significantly after crushing.

Further, the inventors have found, which has led to another aspect of the invention, that a long-lasting phosphor which can achieve the object of the invention can be obtained by changing a solution containing materials including strontium nitrate into fine particles of liquid by spraying and thereafter heating the fine particles of liquid.

According to the invention, there is provided a long-lasting phosphor having a base crystal of åkermanite crystal structure consisting of R' (where R' is one or more elements selected from the group consisting of Ca, Sr and Ba), Mg, Si, O and N and comprising Eu as an activator and one or more elements selected from the group consisting of Sc, Y, La, Ce, Pr, Nd, Sm, Gd, Tb, Dy, Ho, Er, Tm, Yb, Lu and Bi as a co-activator Ln.

In one aspect of the invention, the long-lasting phosphor is provided by sintering a material comprising strontium nitrate and thereby producing the base crystal of åkermanite crystal structure.

In another aspect of the invention, the new Mohs' scale of hardness of the long-lasting phosphor is less than 1.

In another aspect of the invention, phosphorescence brightness measured 2 minutes after stoppage of irradiation of illuminance of 1000 lux for 30 minutes with a white fluorescent lamp is 200 mCd/m$^2$ or over.

In another aspect of the invention, the long-lasting phosphor has a chemical composition aR'O.bMgO.2SiO$_2$.N$_z$:Eu$_x$.Ln$_y$ wherein a, b, x, y and z are within ranges of $1.80 \leq a \leq 2.20$ $0.90 \leq b \leq 1.10$ $1 \times 10^{-5} < x < 1 \times 10^{-1}$ $1 \times 10^{-5} < y < 1 \times 10^{-1}$ $1 \times 10^{-4} < z < 1 \times 10^{-1}$.

In a preferred embodiment of the invention, a and b are within ranges of $1.85 \leq a \leq 2.15$ $0.925 \leq b \leq 1.075$.

In another preferred embodiment of the invention, x, y and z are within ranges of $1 \times 10^{-4} < x < 1 \times 10^{-2}$ $1 \times 10^{-4} < y < 1 \times 10^{-1}$ $1 \times 10^{-4} < z < 1 \times 10^{-2}$.

In another aspect of the invention, there is provided a powdered long-lasting phosphor which is provided by crushing the above-described long-lasting phosphor of the invention.

In another aspect of the invention, there is provided a powdered long-lasting phosphor having a complex oxide type crystal as the base crystal and comprising an activator and a co-activator and being produced by changing a solution containing constituent elements or a material in the state of suspension into fine particles of liquid by atomization and thereafter heating the fine particles of liquid in a gas stream under oxidating, neutral or reducing atmosphere.

In another aspect of the invention, this powdered long-lasting phosphor consists essentially of a compound having a chemical composition RO.aR'$_2$O$_3$ (where R is one or more elements selected from the group consisting of Mg, Ca, Sr, Ba and Zn R' is Al or B and $0.5 \leq a \leq 3.0$) and, Eu as an activator, being added with Eu in an amount within a range from 0.001% to 20% in mol % to the metal element or elements represented by R and, as a co-activator, one or more elements selected from the group consisting of Ce, Pr, Nd, Sm, Tb, Dy, Ho, Er, Tm, Yb and Lu in an amount within a range from 0.001% to 20% in mol % to the metal element or elements represented by R.

In another aspect of the invention, the powdered long-lasting phosphor has a chemical composition $RO.a(Al_{1-x}Ga_x)_2O_3.b(Si_{1-y}Ge_y)O_2.cEu^{2+}.dM^{n+}$ (where R is at least one element selected from the group consisting of alkaline-earth metals including Ba, Sr, Ca, Mg and Zn, and M is at least one co-activator selected from the group consisting of Nb, Zr, Bi, Mn, Sn, La, Ce, Pr, Nd, Sm, Gd, Tb, Dy, Ho, Er, Tm, Yb and Lu, n+ being the ion state of the auxiliary activator with n being an integer) where a, b, c, d, x and y are within ranges of $0.3 \leq a \leq 8$ $0.001 \leq b < 2$ $0.001 \leq c \leq 0.3$ $0.001 \leq d \leq 0.3$ $0 \leq x \leq 1.0$ $0 \leq y \leq 1.0$.

In another aspect of the invention, the powdered long-lasting phosphor is a compound having a chemical composition $RO.aR'_2O_3.bR''_2O_3$ (where R is one or more elements selected from the group consisting of Mg, Ca, Sr, Ba and Zn, R' is Al or B, R'' is Y or Sc, and $0.5 \leq a \leq 3.0$ and $0.001 \leq b \leq 0.2$) and, as an activator, Eu in an amount within a range from 0.001% to 20% in mol % to the metal element or elements represented by R and, as a co-activator, being added with one or more elements selected from the group consisting of Ce, Pr, Nd, Sm, Tb, Dy, Ho, Er, Tm, Yb and Lu in an amount within a range from 0.001% to 20% in mol % to the metal element or elements represented by R.

In another aspect of the invention, the powdered long-lasting phosphor is a compound having a chemical composition $RO.aR'_2O_3.bR''_2O_3$ (where R is one or more elements selected from the group consisting of Mg, Ca, Sr, Ba and Zn R' is Al or B, R'' is Y or Sc, and $0.5 \leq a \leq 3.0$ and $0.001 \leq b \leq 0.2$) and, as an activator, Eu in an amount within a range from 0.001% to 20% in mol % to the metal element or elements represented by R.

In another aspect of the invention, the powdered long-lasting phosphor is a compound having a chemical composition $RO.aR'_2O_3$ (where R is one or more elements selected from the group consisting of Mg, Ca, Sr, Ba and Zn, R' Al or B, and $0.5 \leq a \leq 3.0$) and, as an activator, being added with Eu in an amount within a range from 0.001% to 20% in mol % to the metal element or elements represented by R and, as a co-activator, one or more elements selected from the group consisting of Ce, Pr, Nd, Sm, Tb, Dy, Ho, Er, Tm, Yb, Lu, Y and Sc in an amount within a range from 0.001% to 20% in mol % to the metal element or elements represented by R.

In another aspect of the invention, the powdered long-lasting phosphor has an average particle diameter within a range from 1.0 μm to 70 μm and a coefficient of variation of the particle diameter which is 100% or less.

In another aspect of the invention, there is provided a method for manufacturing the powdered long-lasting phosphor comprising steps of producing a massive long-lasting phosphor having a base crystal of åkermanite crystal structure by sintering a material comprising strontium nitrate and crushing the massive long-lasting phosphor.

In another aspect of the invention, there is provided a method for manufacturing the powdered long-lasting phosphor comprising steps of changing a solution containing constituent elements or a material in the state of suspension into fine particles of liquid by atomization and thereafter heating the fine particles of liquid in a gas stream under oxidating, neutral or reducing atmosphere.

In a preferred embodiment of these methods, temperature of sintering is within a range from 1000° C. to 1500° C.

According to the invention, a long-lasting phosphor can be provided which, compared with the ZnS long-lasting phosphor available in the market and emitting yellowish green light, exhibits much higher phosphorescence brightness and much longer life, is chemically stable and emits light of various emission wavelengths ranging from blue to green. The long-lasting phosphor of the invention therefore contributes to imparting variety to the color and function of the display by the phosphorescence.

The long-lasting phosphor of the invention has high phosphorescence brightness characteristic and weatherproof characteristic and, therefore, the long-lasting phosphor can be used not only for luminous watches and a night-time display of a location in a house but for various other uses such as signs for preventing disasters, signs for indicating locations for keeping away from danger and decorations. Since the long-lasting phosphor of the invention is very fragile, it can be crushed easily to powder having a desired average particle diameter and coefficient of variation of the particle diameter.

Further, since the long-lasting phosphor of the invention has the specific average diameter range and coefficient of variation of the particle diameter as claimed in the appended claim, it has excellent relative phosphorescence brightness.

According to the method of manufacture of the present invention, as compared with the prior art method in which the mixed powdery material is sintered at a high temperature, the crushing and classifying processes can be omitted so that the manufacturing process can be simplified. In this case, since there is no crushing process, there is no possibility of mixing of impurities and uniform mixing at the molecular level can be realized with the result that a long-lasting phosphor of a high purity can be provided. Further, there is no destruction of primary particles whereby deterioration in phosphorescence brightness can be prevented. Furthermore, very uniform particles of the long-lasting phosphor can be obtained with a desired average particle diameter by properly selecting conditions of spraying and heating.

DETAILED DESCRIPTION OF THE INVENTION

The inventors of the present invention have found that a long-lasting phosphor comprising $M'_2.MgSi_2O_7$ (M'=Sr, Ca, Ba) of an åkermanite crystal structure added with nitrogen has excellent phosphorescence characteristics.

As a material of an alkaline earth metal M', a nitrate can be preferably used. As an alkaline earth metal M', Sr can be preferably used as a main ingredient.

For improving phosphorescence brightness, it is necessary to have a desired crystal precipitated by sintering. During precipitation of the crystal, dispersion of atoms in the solid phase and moving of atoms between particles are indispensable. If there is a gas phase between particles, difficulty arises in the moving of atoms between particles. If a material having a melting point at a desired temperature is mixed, a liquid phase is filled between the particles and an atom which has been pushed out of a particle by dispersion of atoms in the solid can move to another particle through the liquid phase in which it is much easier for the atom to move than in a gas phase. Strontium nitrate melts in the vicinity of 600° C. which is near the temperature at which the base crystal of an åkermanite crystal structure (e.g., $Sr_2MgSi_2O_7$) is formed. Therefore, strontium nitrate is a preferable material.

Since there is no space to accept a nitric acid group in the base crystal of an akermanite crystal structure, it seems difficult for a nitric acid group to exist in the base crystal.

Therefore, in the long-lasting phosphor of the present invention, nitrogen is assumed to exist not as a nitric acid ion but as an impurity in the position of oxygen of $Sr_2MgSi_2O_7$ or in a position between atoms or, alternatively, as nitrogen ion present in a grain boundary.

By activating the above described base crystal with Eu and co-activating it with Ln (one or more elements selected from the group consisting of Sc, Y, La, Ce, Pr, Nd, Sm, Gd, Tb, Dy, Ho, Er, Tm, Yb, Lu and Bi), the present invention has succeeded in optimizing the light emission center (Eu) and constituent elements and thereby providing a long-lasting phosphor emitting blue and green phosphorescence which is chemically stable and has excellent resistance to light. In the above-described co-activator Ln, Dy, Ho and Bi are particularly effective.

In one aspect of the invention, the long-lasting phosphor is characterized in that it has a base crystal of an akermanite crystal structure. The composition range thereof is limited and, if the composition is outside of this range, a different crystal phase is produced.

As different crystal phases, there can be produced a merwinite type compound ($M_3MgSi_2O_7$), a monticellite type compound ($MMgSiO_4$), a diopside type compound ($MMgSi_2O_6$) and a pseudowollastonite type compound ($MSiO_3$). These different crystal phases have extremely low phosphorescence characteristics or substantially no phosphorescence characteristics as compared with the akermanite crystal and, therefore, occurrence of such different crystal phase deteriorates the performance of the long-lasting phosphor.

For this reason, a territory in which the akermanite crystal structure is shown in a single phase should be specified. If the long-lasting phosphor is designated by the general formula $aR'O.bMgO.2SiO_2N_x:Eu_x.Ln_y$, the composition ratios a and b should preferably be within ranges of $1.80<a<2.20$ and $0.90<b<1.10$. For obtaining particularly good characteristics, the ranges of the composition ratios should more preferably be $1.92<a<2.08$ and $0.96<b<1.04$.

A suitable composition ratio x of the activator Eu is $10^{-5}<x<10^{-1}$, preferably $10^{-4}<x<10^{-2}$. If the composition ratio x is outside of this range, concentration quenching takes place with resulting deterioration in the phosphorescence brightness when the concentration is too high and the phosphorescence characteristics deteriorate also when the concentration is too low. For improving phosphorescence brightness, Eu should preferably be divalent.

A suitable composition ratio y of the co-activator is $10^{-5}<y<10^{-1}$, preferably $10^{-4}<y<10^{-1}$. If the composition ratio is outside of this range, phosphorescence characteristics deteriorate significantly.

A suitable content range z of nitrogen which is added as a R' nitrate compound is $10-4<z<10^{-1}$ (mol/1 mol of the base). If the amount of nitrogen is outside of this range, deterioration in phosphorescence characteristics takes place.

In a case where a halogen is included in the material, a large-scale apparatus is required for completely recovering produced halogen gas. By using a nitrate as the material, nitric acid produced can be readily recovered by dissolving it into water.

It is preferable for the long-lasting phosphor and powdered long-lasting phosphor of the invention that phosphorescence brightness measured 2 minutes after stoppage of irradiation of illuminance of 1000 lux for 30 minutes with a white fluorescence lamp is 200 $mCd/m^2$ or over and, more preferably, 100 $mCd/m^2$ or over.

Reasons for limiting the average particle diameter and particle shape will now be described. As to the average particle diameter, as a result of studying and examining the most important characteristic of alkaline earth metal aluminate or silicate long-lasting phosphor, that is, the average particle diameter for obtaining excellent phosphorescence characteristics, the inventors of the present invention could determine a proper range of average particle diameter.

As the average particle diameter of the powdered long-lasting phosphor of the invention, an average diameter of 1.0 μm or over is preferable. A more preferable average particle diameter is 2.0 μm or over and particularly preferably average particle diameter is 3.0 μm or over. In an alkaline earth metal aluminate or silicate long-lasting phosphor, phosphorescence characteristics are deteriorated if an average particle diameter of powdered long-lasting phosphor is too small. Particularly, in a case where the average particle diameter is less than 1.0 μm, the alkaline earth metal aluminate or silicate long-lasting phosphor of the invention has only about the same level of phosphorescence characteristics as the prior art long-lasting phosphor (ZnS:Cu) having about the same average particle diameter. Accordingly, the superiority of the long-lasting phosphor of the present invention over the prior art long-lasting phosphor in respect of the phosphorescence characteristics is lost and, moreover, such product cannot be practically used.

There is also an optimum value in the upper limit of the average particle diameter. The phosphorescence characteristics of the alkaline earth metal aluminate or silicate long-lasting phosphor increase in proportion to the increase in the average particle diameter but this proportionate relation ceases to exist after a certain level and the phosphorescence characteristics do not increase significantly even if the average particle diameter increases. Moreover, pigment characteristics (dispersion, coloring and concealing characteristics) are deteriorated with the increase in the average particle diameter and, as a result, the long-lasting phosphor cannot be practically used. For this reason, the average particle diameter of the powdered long-lasting phosphor of the present invention should preferably be 70 μm or below and, more preferably, 50 μm or below and, particularly preferably, 30 μm or below.

In addition to the average particle diameter, coefficient of variation of the particle diameter is important. The narrower the particle diameter distribution is, the better is the pigment characteristics and, therefore, monodisperse particles having a desired diameter are most desirable. As a result of studies and experiments on the particle diameter distribution, it has been found that, if the coefficient of variation of the particle diameter is 100% or less, the pigment characteristics and the phosphorescence characteristics of the long-lasting phosphor are compatible with each other.

If the coefficient of variation in the average particle diameter of the same order exceeds 100%, the width of particle diameter distribution becomes large. This means relative increase in the ratios of fine powder and coarse particles which results in significant deterioration in the phosphorescence characteristics and pigment characteristics of the long-lasting phosphor. A smaller coefficient of variation is more preferable. A preferable range of the coefficient of variation is 85% or less, a more preferable range thereof is 70% or less and the most preferable range thereof is 60% or less. An ideal particle diameter distribution is one of a monodisperse system.

As to the alkaline earth metal aluminate long-lasting phosphor, the powdered long-lasting phosphor which is a compound having a chemical composition $RO.aR'_2O_3$ (where R is one or more elements selected from the group consisting of Mg, Ca, Sr, Ba and Zn, R' is Al or B, and $0.5 \leq a \leq 3.0$) and, as an activator, Eu in an amount within a range from 0.001% to 20% in mol % to the metal element or elements represented by R and, as a co-activator, one or more elements selected from the group consisting of Ce, Pr, Nd, Sm, Tb, Dy, Ho, Er, Tm, Yb and Lu in an amount within a range from 0.001% to 20% in mol % to the metal element or elements represented by R has excellent phosphorescence characteristics. Particularly, the powdered long-lasting phosphor which have the above described average particle diameter and coefficient of variation of the particle diameter and in which each particle of the powder is substantially spherical exhibits more excellent phosphorescence characteristics.

The powdered long-lasting phosphor of the invention which has a chemical composition $RO.a(Al_{1-x}Ga_x)_2O_3.b(Si_{1-y}Ge_y)O_2.cEu^{2+}.dM^{n+}$ (where R is at least one element selected from the group consisting of alkaline-earth metals including Ba, Sr, Ca, Mg and Zn, and M is at least one co-activator selected from the group consisting of Nb, Zr, Bi, Mn, Sn, La, Ce, Pr, Nd, Sm, Gd, Tb, Dy, Ho, Er, Tm, Yb and Lu, n+ being the ion state of the auxiliary activator with n being an integer) where a, b, c, d, x and y are within ranges of $0.3 \leq a \leq 8$ $0.001 \leq b \leq 2$ $0.001 \leq c \leq 0.3$ $0.001 \leq d \leq 0.3$ $0 \leq x < 1.0$ $0 < y \leq 1.0$ has also excellent phosphorescence characteristics.

The powdered long-lasting phosphor which is a compound having a chemical composition $RO.aR'_2O_3.bR''_2O_3$ (where R is one or more elements selected from the group consisting of Mg, Ca, Sr, Ba and Zn, R' is Al or B, R'' is Y or Sc, and $0.5 \leq a \leq 3.0$ and $0.001 \leq b \leq 0.2$) and, as an activator, Eu in an amount within a range from 0.001% to 20% in mol % to the metal element or elements represented by R and, as a co-activator, being added with one or more elements selected from the group consisting of Ce, Pr, Nd, Sm, Tb, Dy, Ho, Er, Tm, Yb and Lu in an amount within a range from 0.001% to 20% in mol % to the metal element or elements represented by R has also excellent phosphorescence characteristics.

The powdered long-lasting phosphor of the invention which is a compound having a chemical composition $RO.aR'_2O_3.bR''_2O_3$ (where R is one or more elements selected from the group consisting of Mg, Ca, Sr, Ba and Zn, R' is Al or B, R'' is Y or Sc, and $0.5 \leq a \leq 3.0$ and $0.001 \leq b \leq 0.2$) and, as an activator, being added with Eu in an amount within a range from 0.001% to 20% in mol % to the metal element or elements represented by R has also excellent phosphorescence characteristics.

The powdered long-lasting phosphor which is a compound having a chemical composition $RO.aR'_2O_3$ (where R is one or more elements selected from the group consisting of Mg, Ca, Sr, Ba and Zn, R' is Al or B, and $0.5 \leq a \leq 3.0$) and, as an activator, Eu in an amount within a range from 0.001% to 20% in mol % to the metal element or elements represented by R and, as a co-activator, one or more elements selected from the group consisting of Ce, Pr, Nd, Sm, Tb, Dy, Ho, Er, Tm, Yb, Lu, Y and Sc in an amount within a range from 0.001% to 20% in mol % to the metal element or elements represented by R has also excellent phosphorescence characteristics.

As to the shape of particles, an irregular shape increases the relative surface area as described above resulting in deterioration in the pigment characteristics and phosphorescence characteristics. Accordingly, the spherical shape which is the smallest in the relative surface area is ideal.

The alkaline earth metal aluminate long-lasting phosphor of the invention can be manufactured, as described above, by weighing, mixing, sintering and crushing materials. According to this method, however, it takes much labor and time for producing a uniform long-lasting phosphor. This is because uniformity of mixed materials before sintering is low. If uniformity can be accomplished in a simple way, much labor and time can be saved. For this purpose, the best way is to mix the materials in the state in which they are dissolved or dispersed in a solvent. Particularly, by using materials which are soluble in a solvent and mixing the materials in the state of a solution, mixing at the atomic or molecular level is made possible and the best possible uniformity can thereby be achieved. Having regard also to the cost of manufacture, it is the best way to dissolve water-soluble salts in water and mix them.

By changing the above described solution or suspension of the materials into fine particles of liquid having a desired particle diameter and heating (i.e., drying/sintering) in a gas stream in oxidating, neutral or reducing atmosphere, the powdered long-lasting phosphor of the invention having spherical particles and uniform composition can be produced. The liquid particles are subjected to the drying process and then to the sintering process. Sintering is basically made in a solid reaction. When sintering is made in a state where there is no solvent, dispersion of atoms is a sole driving force of the reaction. When sintering is made in a state of a solution, mixing is made at the atomic level and, therefore, the materials immediately before the reaction are in an ideal mixed powder state. When the temperature has reached a temperature at which the reaction is started, movement of atoms due to dispersion of atoms takes place and atoms settle at stable positions which are of the lowest energy. At this time, the solvent often remains between particles due to surface tension. In this case, the liquid phase is ideal as a path for a moving atom and atoms are dispersed through this remaining liquid phase.

In the method for manufacturing the long-lasting phosphor according to the invention, temperature of sintering ranges from 1000° C. to 1500° C. for one hour or over, preferably 1000° C. to 1350° C. for two hours or over and, more preferably 1200° C. to 1350° C. for three hours or over. If the temperature of sintering is too low, there tends to take place a portion in which no reaction occurs. If the temperature of sintering is too high, sintered powder in a state in which particles stick together is produced in a large quantity and, by further heating, these particles are sintered together leading to growth of particles. As a result, control of the particle diameter becomes difficult which results in deterioration in the pigment characteristics.

BRIEF DESCRIPTION OF THE DRAWINGS

In the accompanying drawings.

EXAMPLES

Figure 1:
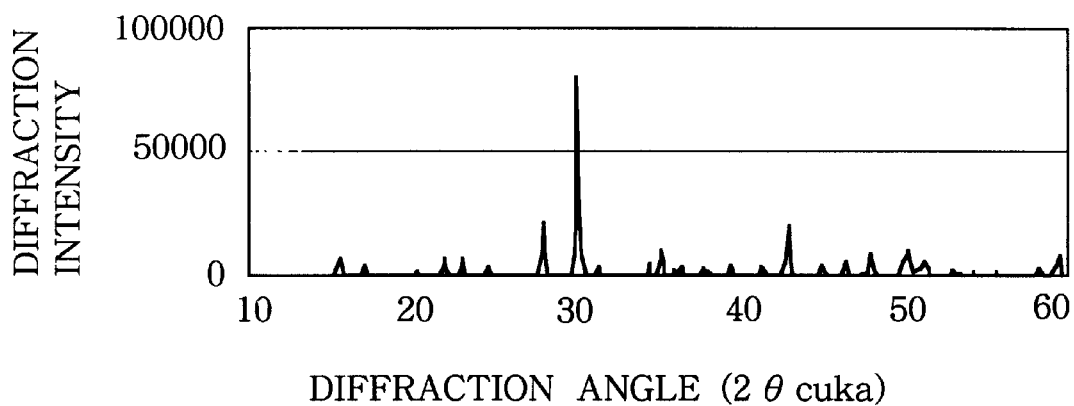
FIG. 1 is an X-ray diffraction diagram of the long-lasting phosphor synthesized in Example 1.

Examples of the present invention will now be described. It should be noted that the present invention is not limited in its scope by these examples.

The long lasting-phosphor and powdered long-lasting phosphor of the present invention are synthesized in the following manner within the claimed ranges of composition. As materials of fine particle long-lasting phosphor, Sr, Ca, Ba, Mg and/or Si and Eu and Ln are used in the form of oxides, carbonates and other salts. Nitrogen is used in the form of a nitrogen compound or nitrate compound of these constituent elements. If, for example, a nitrate compound is used, nitrogen will act partially as a flux to enhance dispersion of atoms between solids and growth of crystal and thereby improve brightness and phosphorescence brightness. The materials are selected so as to form a predetermined composition range and mixed sufficiently by a wet or dry method.

The mixture is filled in a heat resisting container such as an alumina crucible and is sintered in a reducing atmosphere formed by a nitrogen gas containing hydrogen at a temperature within a range from 1000° C. to 1500° C. for one hour or over, preferably at a temperature within a range from 1200° C. to 1350° C. for three hours or over. This sintered product (long-lasting phosphor) is crushed to provide the long-lasting phosphor of the present invention. If necessary, the crushed product is subjected to screening.

For identifying the crystal structure of the long-lasting phosphors of the examples and comparative examples, the X-ray diffraction peaks of the long-lasting phosphors were measured by the X-ray diffraction meter (PW3040) made by Phillips Corporation. The crystal structure was identified on the basis of the diffraction diagram obtained with reference to JCPDS files. JCPDS File No. 15-0016 indicates diffraction data of àkermanite.

For measuring emission spectra of these long-lasting phosphors, a fluorescence spectrophotometer (FP-750 made by JASCO Corporation) was used. For measuring excitation spectra, plotting was made by fixing spectral wavelength on the output side of the spectrophotometer to 470 nm and scanning excitation wavelengths. For measuring excitation spectra, the fluorescence spectrophotometer (FP-750 made by JASCO Corporation) was used.

For measuring phosphorescence brightness, fluorescent lamp of D65 (FL20S·D-EDL-D65, rating 220 W) made by Toshiba Litec Kabushiki Kaisha was used and illuminance of 1000 lux for 30 minutes was irradiated for excitation over samples which were placed out of light during 24 hours. Luminance was measured by the luminance meter LS-100 made by Minolta Kabushiki Kaisha, starting one minute after stoppage of excitation until 60 minutes after stoppage of excitation.

The content of nitrogen in the long-lasting phosphors was obtained by a nitrogen analyzing device including a sample melting system utilizing the impulse heating and melting extraction method and a detection system utilizing the heat conduction method.

As described above, the long-lasting phosphor of the present invention exhibits high phosphorescence brightness and long life, has excellent weather-proof property and chemical stability and does not produce a poisonous gas during sintering and, moreover, is easy to crush. For these reasons, as compared with the prior art ZnS long-lasting phosphor, the long-lasting phosphor of the present invention can be applied not only for indoor uses but also for a variety of outdoor uses. For example, the long-lasting phosphor of the invention can be coated on the surface of various articles, or can be mixed with resin or rubber and used, as a formed product or as a fluorescence source, for various articles including road signs, visibility displays, decorations, leisure articles, watches, office automation equipments, educational equipments, safety signs and building materials.

Example 1

TABLE 1

| element | mole | material | amount used |
| --- | --- | --- | --- |
| Sr | 2 | Sr(NO$_3$)$_2$ | 7.196 g |
| Mg | 1 | MgO | 0.685 g |
| Si | 2 | SiO$_2$ | 2.043 g |
| Eu | 0.002 | Eu$_2$O$_3$ | 0.012 g |
| Dy | 0.01 | Dy$_2$O$_3$ | 0.063 g |

The materials described in Table 1 were weighed and sufficiently mixed. The mixture powder was placed in an atmosphere furnace using an alumina sintering tube as a furnace chamber and was sintered in a reducing atmosphere in which a nitrogen mixed gas containing 3% hydrogen was flowing at a temperature of 1350° C. for three hours. The sintered long-lasting phosphor was very fragile and could be crushed easily. The X-ray diffraction diagram of CuKα-ray of the crushed long-lasting phosphor is shown in FIG. 1. The powder was identified to JCPDS File No. 15-0016 indicating the àkermanite crystal structure.

Figure 2:
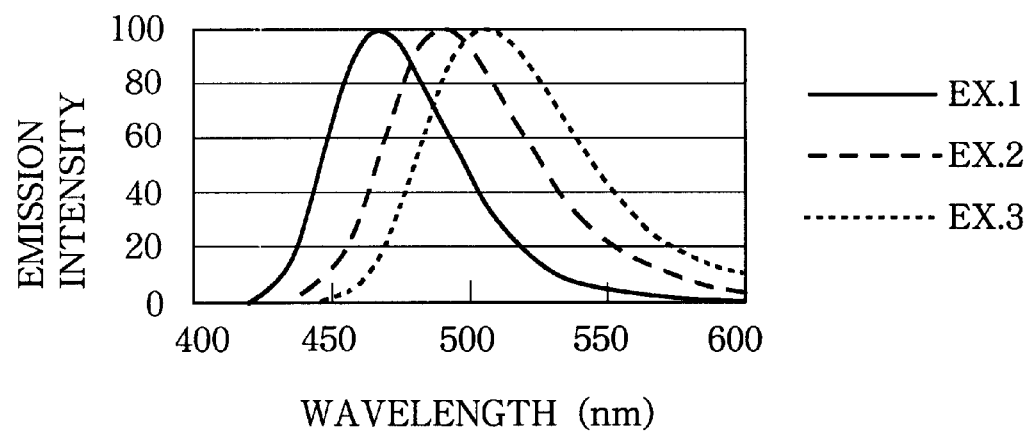
FIG. 2 is a graph showing the emission spectra of the long-lasting phosphors synthesized in Examples 1 to 3 which have been excited with 365 nm ultraviolet ray.
Figure 3:
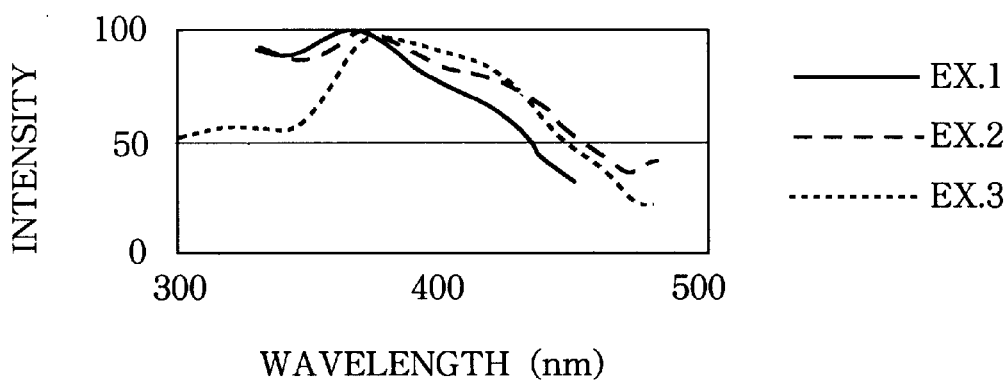
FIG. 3 is a graph showing the excitation spectra of the long-lasting phosphors synthesized in Examples 1 to 3.
Figure 4:
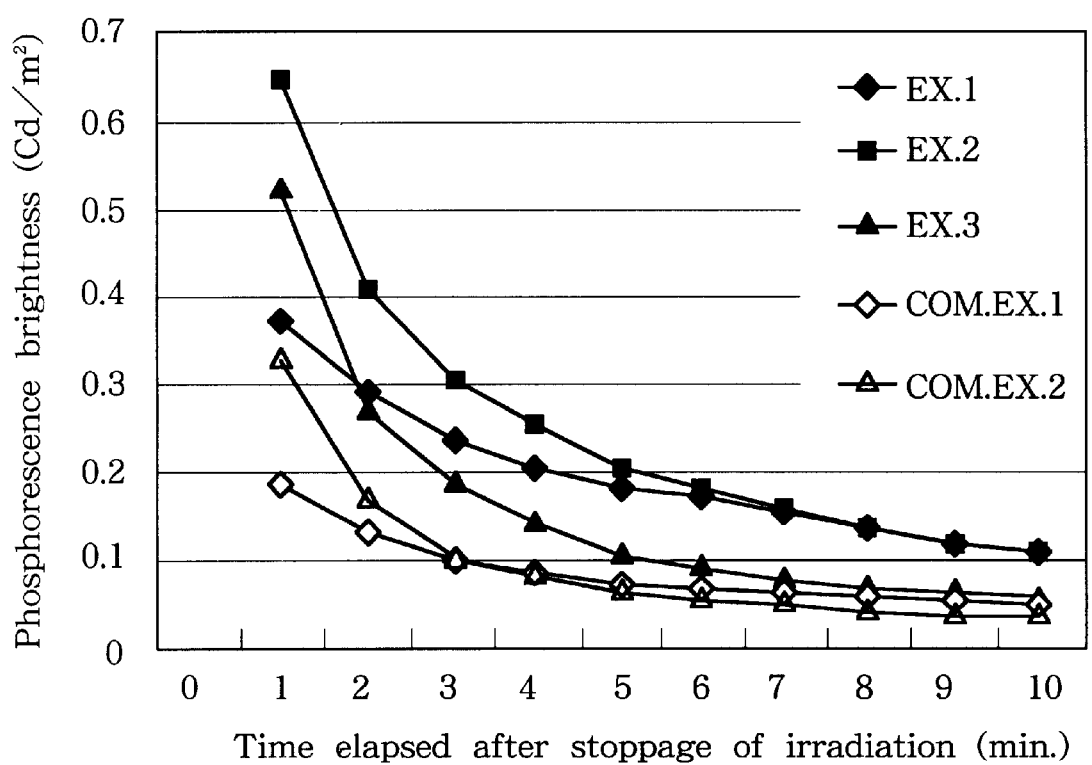
FIG. 4 is a graph comparing phosphorescence characteristics of the long-lasting phosphors of Examples 1 to 3 with the long-lasting phosphors of Comparative Examples 1 and 2.

The measured emission spectrum and excitation spectrum are shown respectively in FIG. 2 and FIG. 3. Its emission peak wavelength is 470 nm emitting blue light. The excitation spectrum extends to the visible ray range. Its phosphorescence characteristics show long lasting phosphorescence as shown in FIG. 4. The emission peak wavelength and phosphorescence characteristics (phosphorescence brightness after 10 minutes and 60 minutes) are shown in Table 4.

Example 2

TABLE 2

| element | mole | material | amount used |
|---------|------|----------|-------------|
| Sr | 1.2 | $Sr(NO_3)_2$ | 5.090 g |
| Ca | 0.8 | $CaCO_3$ | 1.605 g |
| Mg | 1 | MgO | 5.090 g |
| Si | 2 | $SiO_2$ | 0.808 g |
| Eu | 0.002 | $Eu_2O_3$ | 0.014 g |
| Dy | 0.01 | $Dy_2O_3$ | 0.075 g |

The materials of Table 2 were sufficiently mixed and were processed in the same manner as in Example 1 except that the sintering temperature was 1300° C.

The result of the X-ray diffraction indicates that the crystal structure of the sintered sample was a single phase of åkermanite crystal structure.

The phosphorescence characteristics of the sample were measured and its emission spectrum and excitation spectrum are respectively shown in FIG. 2 and FIG. 3. The emission spectrum exists on the longer wavelength side of Example 1. The excitation spectrum extends to the visible ray range.

The emission peak wavelength and phosphorescence characteristics are shown in Table 4.

Example 3

TABLE 3

| element | mole | material | amount used |
|---------|------|----------|-------------|
| Sr | 0.8 | $Sr(NO_3)_2$ | 3.727 g |
| Ca | 1.2 | $CaCO_3$ | 2.643 g |
| Mg | 1 | MgO | 0.887 g |
| Si | 2 | $SiO_2$ | 2.645 g |
| Eu | 0.002 | $Eu_2O_3$ | 0.015 g |
| Dy | 0.01 | $Dy_2O_8$ | 0.082 g |

The materials of Table 3 were sufficiently mixed and were processed in the same manner as in Example 1 except that the sintering temperature was 1300° C.

The result of the X-ray diffraction indicates that the crystal structure of the sintered sample was a single phase of åkermanite crystal structure.

The phosphorescence characteristics of the sample were measured and its emission spectrum and excitation spectrum are respectively shown in FIG. 2 and FIG. 3. The emission spectrum exists on the shorter wavelength side of Example 2. The excitation spectrum extends to the visible ray range.

The emission peak wavelength and phosphorescence characteristics are shown in Table 4.

Examples 4–11

Samples of Examples 4 to 11 having the chemical composition described in Table 4 were synthesized in the same manner as in Example 1. The new Mohs' scale of hardness, emission peak wavelengths and phosphorescence brightness of the respective samples are shown in Table 4.

Comparative Examples 1 and 3

In Comparative Example 1, $Sr_2MgSi_2O_2$:Eu was synthesized in the same manner as in Example 1 except that $SrCO_3$ was used instead of $Sr(NO_3)_2$. Comparative Example 2 is a ZnS:Cu long-lasting phosphor emitting yellowish green light. Comparative Example 3 is a long-lasting phosphor obtained by adding boric acid to the material of Comparative Example 1 and changing the amounts of Eu and Dy. The new Mohs' scale of hardness, emission peak wavelengths and phosphorescence brightness are shown in Table 4. In Table 5, analyzed values of N in the respective long-lasting phosphors of Examples 1 to 11 and Comparative Examples 1 to 3 are shown as Z value. The Z values of Comparative Examples 1 to 3 are less than 0.0001. In Table 4, the word Example is abbreviated as "Ex." and the word Comparative Example is abbreviated as "Com.".

TABLE 4

| | chemical composition | new Mohs' hardness | emission peak nm | phosphorescence characteristics ($mCd/m^2$) | |
|---|---|---|---|---|---|
| | | | | 10 min. after | 50 min . . . after |
| Ex. 1 | $Sr_2MgSi_2O_7N_Z$: 0.002Eu · 0.01Dy | less than 1 | 468 | 117 | 26 |
| Ex. 2 | $Sr_{1.2}Ca_{0.8}MgSi_2O_7N_Z$: 0.002Eu · 0.001Dy | less than 1 | 491 | 112 | 17 |
| Ex. 3 | $Sr_{0.8}Ca_{1.2}MgSi_2O_7N_Z$: 0.002Eu · 0.01Dy | less than 1 | 504 | 53 | 5 |
| Ex. 4 | $Sr_{0.8}Ba_{1.2}MgSi_2O_7N_Z$: 0.002Eu · 0.01Dy | less than 1 | 451 | 28 | 6 |
| Ex. 5 | $Sr_2MgSi_2O_7N_Z$: 0.005Eu · 0.02Dy | less than 1 | 470 | 113 | 23 |
| Ex. 6 | $Sr_2Mg_{0.96}Si_2O_{6.96}N_Z$: 0.002Eu · 0.01Dy | less than 1 | 469 | 126 | 24 |
| Ex. 7 | $Sr_2Mg_{1.1}Si_2O_{7.1}N_Z$: 0.002Eu 0.01Dy | less than 1 | 468 | 155 | 32 |
| Ex. 8 | $Sr_{2.04}Mg_{1.02}Si_2O_{6.92}N$: 0.002Eu · 0.01Dy | less than 1 | 470 | 140 | 27 |
| Ex. 9 | $Sr_{2.04}MgSi_2O_{7.04}N_Z$: 0.002Eu · 0.01Dy | less than 1 | 470 | 140 | 27 |
| Ex. 10 | $Sr_{2.2}MgSi_2O_{7.2}N_Z$: 0.002Eu · 0.01Dy | less than 1 | 469 | 62 | 11 |
| Ex. 11 | $Sr_{1.88}Mg_{1.02}Si_2N_Z$: 0.004Eu · 0.02Dy | less than 1 | 470 | 135 | 25 |

TABLE 4-continued

|  | chemical composition | new Mohs' hardness | emission peak nm | phosphorescence characteristics (mCd/m$^2$) 10 min. after | 50 min . . . after |
|---|---|---|---|---|---|
| Com. 1 | $Sr_2MgSi_2O_7$: 0.002Eu · 0 0.01Dy | less than 1 | 470 | 43 | 10 |
| Com. 2 | ZnS:Cu | — | 527 | 27 | 2 |
| Com. 3 | $Sr_2MgSi_2O_7$ + $2H_3BO_3$: 0.004Eu · 0.02Dy | 7 | 469 | 90 | 20 |

TABLE 5

|  | Z |
|---|---|
| Example 1 | 0.0014 |
| Example 2 | 0.0006 |
| Example 3 | 0.0005 |
| Example 4 | 0.0004 |
| Example 5 | 0.0012 |
| Example 6 | 0.0014 |
| Example 7 | 0.0015 |
| Example 8 | 0.0015 |
| Example 9 | 0.0014 |
| Example 10 | 0.0009 |
| Example 11 | 0.0012 |
| Comparative Example 1 | less than 0.0001 |
| Comparative Example 2 | less than 0.0001 |
| Comparative Example 3 | less than 0.0001 |

The Comparative Example 3 using boric acid in the material was very hard and it was difficult to crush it.

In one aspect of the invention, it is necessary, as described above, to dissolve or disperse materials used in a common solvent. Solvents which can be used for this purpose include strong acids such as mineral acids including hydrochloric acid and nitric acid, weak acids such as phosphoric acid and acetic acid, bases such as sodium hydroxide and potassium hydroxide, neutral solvents such as water, and organic solvents including alcohols such as ethanol and ketones. The solvent is not limited to a single type of solvent but a mixed solvent may be used. For supplying fine particles of liquid of a uniform concentration in a stable and inexpensive manner, water is particularly preferable among these solvents.

As materials of the long-lasting phosphor having the above described novel alkaline earth metal aluminate crystal as the base crystal can be used carbonates, nitrates, oxalates, acetates, halides, oxides, hydroxides and organic salts such as metal alkoxides and metal chelates. Materials (solutes) which can dissolve safely in a solvent used may be selected from among these materials. When water is used as the solvent, nitrates and halides which have high solubility to water are preferable and nitrates are particularly preferable. By mixing the prepared solution by stirring it with a stirrer, a solution which is highly uniform at the molecular level can be obtained and mixing of impurities from a mixing medium can be completely prevented. It is not necessary to dissolve the materials completely in the solvent but the materials may exist in the solvent in the form of suspension in which powder of the materials are dispersed in a stable manner. In short, it will suffice if the materials are uniformly contained in a desired composition in fine particles of liquid when the solution is changed to the fine particles of liquid.

A solution of dissolved materials (hereinafter called "solution") can be changed into fine particles of liquid in the following manner. For obtaining, for example, particles having an average particle diameter in the order of several $\mu$m, an electrostatic method may be used. For obtaining particles having an average particle diameter of 10 $\mu$m or less, a method using a ultrasonic vibrator used in a humidifier can be utilized. For obtaining particles having an average particle diameter exceeding 10 $\mu$m, fine particles of liquid may be generated by spraying the solution through a nozzle or by carrying the solution on a gas stream injected from a nozzle which is provided coaxially with a nozzle for injecting the solution. In the present specification, the term "atomization" is used to include changing of a solution into fine particles of liquid by using any of these methods. These method for generating fine particles of liquid are not limited to specific particle diameter ranges but any apparatus may be used if the solution can be changed into fine particles of liquid having a desired range of particle diameter. By selecting optimum conditions for atomization with respect to each of these methods, fine particles of liquid having a uniform particle diameter can be generated and, by heating these fine particles of liquid, fine particles of a uniform particle diameter can be obtained.

Fine particles of liquid are produced by one of the above-described methods and are carried by a gas stream to a heating zone. The gas stream is used for controlling the atmosphere to an oxidating, neutral or reducing atmosphere and also for carrying the fine particles of liquid. For producing the gas stream, $N_2$, $O_2$, Ar and $H_2$, for example, can be used singly or as a mixed gas. For example, in a case where a long-lasting phosphor expressed by a chemical formula $SrAl_2O_4$:$Eu^{2+}$ is produced, an $H_2$ gas or a mixed gas of $N_2$ and $H_2$ is used for reducing trivalent europium to divalent europium.

In the fine particles of liquid which have been carried by the gas stream to the heating zone, the solvent is evaporated from the fine particles of liquid at an initial stage of heating and fine particles are thereby produced. For heating the fine particles of liquid, induction heating, infrared heating, electric resistance heating and combustion heating, for example, may be used. Depending upon the heating method and heating conditions, the fine particles of liquid are heated from inside or outside. When, for example, electric resistance heating is used, the fine particles of liquid are heated from outside and, therefore, they start to solidify from the surface thereof. When induction heating is used, the fine particles of liquid start to solidify from inside. When they solidify from inside, very fine and dense particles are formed and the reaction in the sintering process is enhanced.

Any of the above-described heating method can be selected as the heating means of the invention, if it can provide the target reaction temperature. Further, as a special type of heating method, combustion heating using gas flame may be used. The gas flame can be generated by ignition in a gas atmosphere made of a reducing gas and/or an oxidating gas while controlling the gas atmosphere and can provide reaction energy. As described above, there are various heating methods but, in short, heating is a means for providing necessary temperature for the required reaction and the heating method is not limited to the above described ones.

In a case where the average particle diameter is relatively small, the fine particles of liquid can be transferred from the drying step to the sintering step in a relatively short length of time. In a case where a desired average particle diameter is relatively large, however, if abrupt heating is made, crystal of salt or suspension precipitates on the surface of the fine particles of liquid but the solvent still remains inside of the particles and, therefore, the surface portion of the particles is broken by bursting caused by vapor pressure produced by the solvent and, as a result, uniform spherical particles cannot be produced and, moreover, undesirable powder is produced. Accordingly, it is preferable to employ a two-step process in which particles in a dried state are first produced by holding the speed of temperature elevation at a relatively low speed to prevent occurrence of bursting of the particles and then the particles are subjected to the sintering process. Aternatively, instead of employing such two-step process (drying and sintering), an arrangement may be made in the heating apparatus so that a drying part of one step is prolonged, i.e., by extending the drying time or controlling the length of time during which the particles are staying in the drying portion of the apparatus.

If the conditions of atomization and heating temperature are the same, control of the particle diameter is made by concentration of metal. If the concentration of the metal is high, the particle diameter increases whereas, if the concentration of the metal is low, the particle diameter decreases. In any case, if fine particles of liquid having a uniform size are produced in the process of changing the solution to fine particles of liquid and these particles do not burst in the heating (drying and sintering) process, fine particles of the long-lasting phosphor having a very uniform particle diameter can be produced. Since the fine particles of the long-lasting phosphor have a narrow particle diameter distribution and therefore do not require classification, the fine particles of the long-lasting phosphor can be manufactured in a much simpler way than in the prior art long-lasting phosphor using the crushing method.

The particles produced by the reaction are carried on the gas stream to a collection section. Particles of several $\mu$m or over can be collected by a physical method such as a cyclone. For collecting particles of a smaller size, method using a ceramic filter, a bag filter or electrostatic force can be employed. In case the bag filter is used, small particles may drop out at an initial stage of collection but, when the particles have been collected to some degree, the collected particles form a precoat filter and thereby enhance the collection efficiency. In any case, the purpose of these methods is to collect particles and any suitable collection method may be employed depending upon the particle size.

By optimizing conditions of manufacturing process including the method of atomization, method of heating (drying and sintering) and carrier gas, particles of an excellent crystal structure can be obtained. Even when particles of poor crystal structure have been produced, the crystal structure can be improved by re-heating the particles. More specifically, by re-heating the powdered long-lasting phosphor in an oxidating, neutral or reducing atmosphere and subjecting them to the solid reaction, a powdered long-lasting phosphor of an improved crystal structure can be provided.

Example 12

A solution of materials was prepared by dissolving $Sr(NO_3)_2$, $Al(NO_3)_3$, $Eu(NO_3)_3$ and $Dy(NO_3)_3$ in distilled water so that the molar ratio of the respective ingredients would become $SrO:Al_2O_3: Eu:Dy=50:50:0.1:0.1$. This solution was changed to fine particles of liquid by using an ultrasonic vibrator. A gas of $N_2/H_2=97/3$ was used as a gas stream to transfer the fine particles of liquid and controlling the reducing atmosphere. Drying of the fine particles of liquid and subsequent reaction between solids were made at the heating temperature of 1300° C. using a quarts tube as a reaction tube. Fine particles of long-lasting phosphor produced were collected with a bag filter.

Upon irradiation of light on the long-lasting phosphor thus produced, the long-lasting phosphor emitted yellowish green light in a dark place. This emission of light was observed for more than 24 hours.

Example 13

A solution of materials was prepared by dissolving $Sr(NO_3)_2$, $Al(NO_3)_3$, $Eu(NO_3)_3$ and $Dy(NO_3)_3$ in distilled water so that the molar ratio of the respective ingredients would become $SrO:Al_2O_3:Eu:Dy=50:50:0.3:0.3$. This solution was changed to fine particles of liquid by using an ultrasonic vibrator. A gas of $N_2/H_2=97/3$ was used as a gas stream to transfer the fine particles of liquid and controlling the reducing atmosphere. Drying of the fine particles of liquid and subsequent reaction between solids were made at the heating temperature of 1300° C. using a quarts tube as a reaction tube. Fine particles of long-lasting phosphor produced were collected with a bag filter.

Upon irradiation of light on the long-lasting phosphor thus produced, the long-lasting phosphor emitted yellowish green light in a dark place. This emission of light was observed for more than 24 hours.

Example 14

A solution of materials was prepared by dissolving $Ca(NO_3)_2$, $Al(NO_3)_3$, $H_3BO_3$, $Eu(NO_3)_3$ and $Dy(NO_3)_3$ in distilled water so that the molar ratio of the respective ingredients would become $CaO:Al_2O_3:B_2O_3:Eu:Dy=50:50:0.15:0.3:0.3$. This solution was changed to fine particles of liquid by using an ultrasonic vibrator. A gas of $N_2/H_2=97/3$ was used as a gas stream to transfer the fine particles of liquid and controlling the reducing atmosphere. Drying of the fine particles of liquid and subsequent reaction between solids were made at the heating temperature of 1300° C. using a quarts tube as a reaction tube. Fine particles of long-lasting phosphor produced were collected with a bag filter.

Upon irradiation of light on the long-lasting phosphor thus produced, the long-lasting phosphor emitted blue light in a dark place. This emission of light was observed for more than 12 hours.

Example 15

A solution of materials was prepared by dissolving $Sr(NO_3)_2$, $Al(NO_3)_3$, TEOS(tetra ethoxy silane), $Eu(NO_3)_3$ and $Dy(NO_3)_3$ in distilled water so that the molar ratio of the respective ingredients would become $SrO:Al_2O_3:SiO_2:Eu:Dy=50:50:0.4:0.4:0.4$. This solution was changed to fine particles of liquid by using an ultrasonic vibrator. A gas of $N_2/H_2=97/3$ was used as a gas stream to transfer the fine particles of liquid and controlling the reducing atmosphere. Drying of the fine particles of liquid and subsequent reaction between solids were made at the heating temperature of 1300° C. using a quarts tube as a reaction tube. Fine particles of long-lasting phosphor produced were collected with a bag filter.

Upon irradiation of light on the long-lasting phosphor thus produced, the long-lasting phosphor emitted green light in a dark place. This emission of light was observed for more than 24 hours.

Example 16

A solution of materials was prepared by dissolving $Ca(NO_3)_2$, $Al(NO_3)_3$, $Y(NO_3)_3$, $Eu(NO_3)_3$ and $Dy(NO_3)_3$ in distilled water so that the molar ratio of the respective ingredients would become $CaO:Al_2O_3\ Y_2O_3:Eu:Dy= 50:50:0.15:0.3:0.3$. This solution was changed to fine particles of liquid by using an ultrasonic vibrator. A gas of $N_2/H_2=97/3$ was used as a gas stream to transfer the fine particles of liquid and controlling the reducing atmosphere. Drying of the fine particles of liquid and subsequent reaction between solids were made at the heating temperature of 1300° C. using a quarts tube as a reaction tube. Fine particles of long-lasting phosphor produced were collected with a bag filter.

Upon irradiation of light on the long-lasting phosphor thus produced, the long-lasting phosphor emitted blue light in a dark place. This emission of light was observed for more than 12 hours.

Example 17

A solution of materials was prepared by dissolving $Ca(NO_3)_2$, $Al(NO_3)_3$, $Y(NO_3)_3$ and $Eu(NO_3)_3$ in distilled water so that the molar ratio of the respective ingredients would become $CaO:Al_2O_3:Y_2O_3:Eu:Dy=50:50:0.15:0.3$. This solution was changed to fine particles of liquid by using a ultrasonic vibrator. A gas of $N_2/H_2=97/3$ was used as a gas stream to transfer the fine particles of liquid and controlling the reducing atmosphere. Drying of the fine particles of liquid and subsequent reaction between solids were made at the heating temperature of 1300° C. using a quarts tube as a reaction tube. Fine particles of long-lasting phosphor produced were collected with a bag filter.

Upon irradiation of light on the long-lasting phosphor thus produced, the long-lasting phosphor emitted blue light in a dark place. This emission of light was observed for more than 12 hours.

Example 18

By using the method of Example 12 and varying the particle diameter of the fine particles of liquid, powdered long-lasting phosphors having various average particle diameters and coefficients of variation were prepared. As to powdered long-lasting phosphors having average particle diameters and coefficients of variation which cannot be obtained by this method, fine particles of liquid were produced by a spray method using a twin-fluid type nozzle, these fine particles of liquid were dried and sintered by the above described method to produce a powdered long-lasting phosphor and this powdered long-lasting phosphor was classified and, when necessary, the classified products were mixed at a proper ratio. Particle diameters of the powdered long-lasting phosphors thus produced were measured by using the laser beam dispersion diffraction type particle size meter LS100Q made by Beckman Coulter, Inc. using 0.5% sodium hexametaphosphate solution as a dispersion medium. Arithmetic mean particle diameter of measured particle size distribution based on the volume is used as the average particle diameter. The coefficient of variation (%) showing variation in the particle diameter is a value obtained by dividing standard deviation of the particle diameter by the average particle diameter and multiplying the quotient by 100.

Relative phosphorescence brightness was measured in the following manner. The D65 light source (FL20S·D-EDL-D65 made by Toshiba Litec Kabushiki Kaisha) was used to irradiate illuminance of 200 lux for 4 minutes and the phosphorescence brightness was measured by a luminance meter. As to relation between the coefficient of variation of the particle diameter and the relative phosphorescence brightness, phosphorescence brightness of a powdered long-lasting phosphor having an average particle diameter of 20μm and coefficient of variation of 30% was taken as 100% and the ratio of phosphorescence brightness thereto was expressed in percentage in FIG. 5. As to relation between the average particle diameter and the relative phosphorescence brightness at each coefficient of variation, phosphorescence brightness of a powdered long-lasting phosphor having an average particle diameter of 100 μm and coefficient of variation of 42% was taken as 100% and the ratio of phosphorescence brightness thereto was expressed in percentage in FIG. 6. Coefficient of variation of the particle diameter at each average particle diameter was taken within 40%±10%.

Pigment characteristics of Example 18 were measured. In measuring the pigment characteristics, the pigment test method of JIS K5101 was used. Samples having a coefficient of variation of 40%±10% with respect to each average particle diameter were prepared and pigments characteristics were estimated. Results of the measurement are shown in Table 6. Samples having various coefficients of variation at the average particle diameter of 45 μm±5 μm were also prepared and pigment characteristics were estimated. Results of the measurement are shown in Table 7. In Tables 6 and 7, the best result is indicated with the mark ⊙, a good result with the mark ○ and a poor result with the mark X, respectively. Pigment characteristics of the powdered long-lasting phosphor of Example 1 were also measured and the result showed similar pigment characteristics.

TABLE 6

| average particle diameter μm | 5 | 24 | 47 | 63 | 86 |
|---|---|---|---|---|---|
| coloring property | ⊙ | ⊙ | ⊙ | ○ | × |
| concealing property | ⊙ | ⊙ | ⊙ | ○ | × |
| dispersion | ⊙ | ⊙ | ⊙ | ○ | × |

TABLE 7

| coefficient of variation of particle diameter % | 49 | 63 | 81 | 95 | 120 |
|---|---|---|---|---|---|
| coloring property | ⊙ | ⊙ | ○ | ○ | × |
| concealing property | ⊙ | ⊙ | ○ | ○ | × |
| dispersion | ⊙ | ⊙ | ⊙ | ○ | × |

Figure 5:
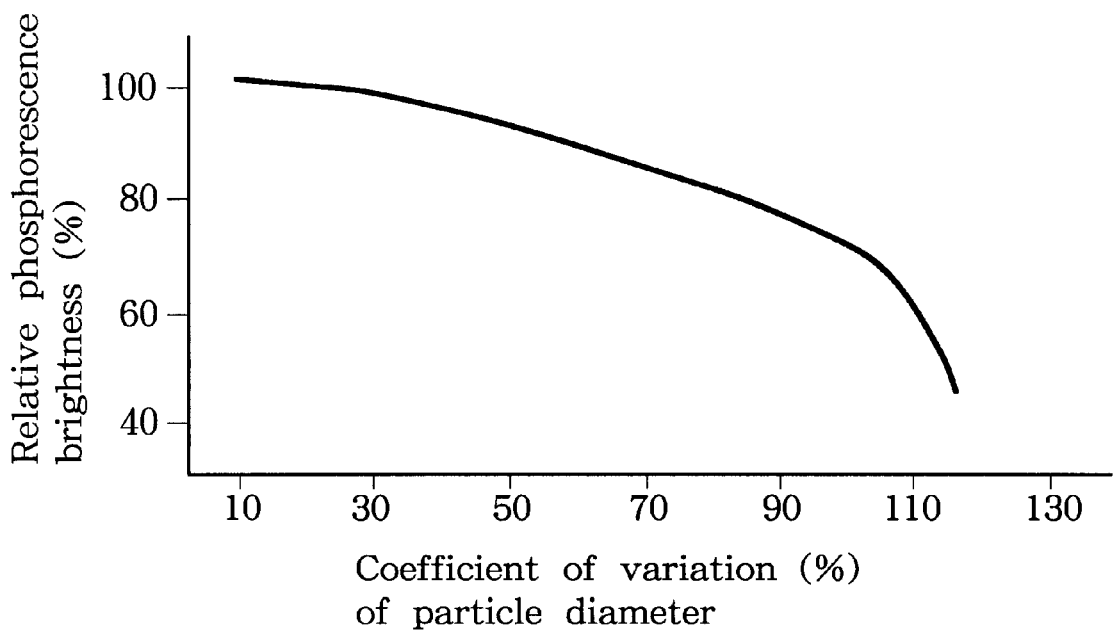
FIG. 5 is a graph showing relation between a coefficient of variation of a particle diameter and relative phosphorescence brightness when phosphorescence brightness of a long-lasting phosphor having the average particle diameter of 100 μm and the coefficient of variation of the particle diameter of 30% is 100%.
Figure 6:
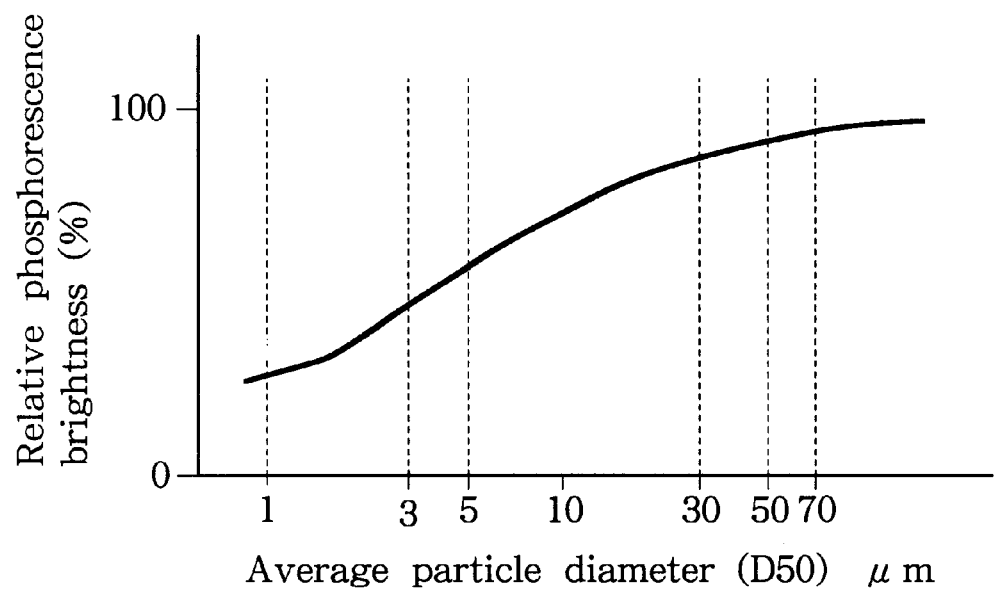
FIG. 6 is a graph showing relation between an average particle diameter and relative phosphorescence brightness when the phosphorescence brightness of the long-lasting phosphor having the average particle diameter of 100 μm and the coefficient of variation of the particle diameter of 42% is 100%.

As shown in FIG. 5, the relative phosphorescence brightness decreases with the increase in the coefficient of variation of the particle diameter. Particularly, the decrease is significant if the coefficient of variation exceeds 100%. As shown in FIG. 6, the relative phosphorescence brightness decreases with the decrease in the average particle diameter. From these relations, the coefficient of variation of the particle diameter of the powdered long-lasting phosphor should be 100% or below, preferably 85% or below and, more preferably be 70% or below and, most preferably be 60% or below. The average particle diameter should be within a range from 1.0 μm to 70 μm, preferably be within a range from 2.0 μm to 50 μm and, more preferably be within a range from 3.0 μm to 30 μm.

What is claimed is:

1. A long-lasting phosphor halving a base crystal comprising Eu as an activator and Ln as a co-activator where Ln is one or more elements selected from the group consisting of Sc, Y, La, Ce, Pr, Nd, Sm, Gd, Tb, Dy, Ho, Er, Tm, Yb, Lu and Bi, said base crystal having akermanite crystal structure consisting of R' (where R' is one or more elements selected from the group consisting of Ca, Sr and Ba), Mg, Si, O and N.

2. A long-lasting phosphor as defined in claim 1 which is provided by sintering a mixture comprising strontium nitrate and thereby producing the base crystal of aklermanite crystal structure.

3. A long-lasting phosphor as defined in claim 1 wherein the new Mohs' scale of hardness of the long-lasting phosphor is less than 1.

4. A long-lasting phosphor as defined in claim 1 wherein phosphorescence brightness measured 2 minutes after stoppage of irradiation of illuminance of 1000 lux for 30 minutes with a white fluorescent lamp is 200 mCd/m$^2$ or over.

5. A long-lasting phosphor as defined in claim 4 which is provided by sintering a mixture comprising strontium nitrate and thereby producing the base crystal of akermanite crystal structure.

6. A long-lasting phosphor as defined in claim 4 wherein the new Mohs' scale of hardness of the long-lasting phosphor is less than 1.

7. A long-lasting phosphor as defined in claim 1 having a chemical composition $aR'O.bMgO.2SiO_2.N_z:Eu_x.Ln_y$ wherein a, b, x, y and z are within ranges of $$1.80 \leq a \leq 2.20$$

$$0.90 \leq b \leq 1.10$$

$$1 \times 10^{-5} < x < 1 \times 10^{-1}$$

$$1 \times 10^{-5} < y < 1 \times 10^{-1}$$

$$1 \times 10^{-4} < z < 1 \times 10^{-1}.$$

8. A long-lasting phosphor as defined in claim 7 wherein a and b are within ranges of $$1.85 \leq a \leq 2.15$$

$$0.925 \leq b \leq 1.075.$$

9. A long-lasting phosphor as defined in claim 7 wherein x, y and z are within ranges of $$1 \times 10^{-4} < x < 1 \times 10^{-2}$$

$$1 \times 10^{-4} < y < 1 \times 10^{-1}$$

$$1 \times 10^{-4} < z < 1 \times 10^{-2}.$$

10. A powdered long-lasting phosphor which is provided by crushing the long-lasting phosphor as defined in claim 1.

11. A method for manufacturing a powdered long-lasting phosphor as defined in claim 6 comprising the steps of producing a massive long-lasting phosphor having a base crystal of akermanite crystal structure by sintering a mixture comprising strontium nitrate and crushing the massive long-lasting phosophor.

12. A method for manufacturing a powdered long-lasting phosphor as defined in claim 11 wherein the temperature of sintering is within a range from 1000° C. to 1500° C.

13. A powdered tong-lasting phosphor of claim 10 having an average particle diameter within a range of from 1.0 μm to 70 μm and a coefficient of variation of the particle diameter which is 100% or less.

14. A powdered long-lasting phosphor having an average particle diameter within a range from 1.0 μm to 70 μm and a coefficient of variation of the particle diameter which is 100% or less, having a complex oxide type crystal as the base crystal and comprising an activator and a co-activator and being produced by changing a solution containing constituent elements or a mixture in the state of suspension into fine particles of liquid by atomization and thereafter heating the fine particles of liquid in a gas stream under an oxidating, neutral or reducing atmosphere.

15. A method for manufacturing a powdered long-lasting phosphor of claim 14 comprising the steps of changing a solution containing constituent elements or a mixture in the state of suspension into fine particles of liquid by atomization and thereafter heating the fine particles of liquid in a gas stream under an oxidating, neutral or reducing atmosphere.

16. A powdered long-lasting phosphor as defined in claim 14 having a chemical composition $RO.a(Al_{1-x}Ga_x)_2O_3.b(Si_{1-y}Ge_y)O_2.cEu^{2+}.dM^{n+}$ (where R is at least one element selected from the group consisting of alkaline-earth metals including Ba, Sr, Ca, Mg and Zn, and M is at least one co-activator selected from the group consisting of Nb, Zr, Bi, Mn, Sn, La, Ce, Pr, Nd, Sm, Gd, Tb, Dy, Ho, Er, Tm, Yb and Lu, n+ being the ion state of the auxiliary activator with n being an integer) where a, b, c, d, x and y are within ranges of $$0.3 \leq a \leq 8$$

$$0.001 \leq b \leq 2$$

$$0.001 \leq c \leq 0.3$$

$$0.001 \leq d \leq 0.3$$

$$0 \leq x \leq 1.0$$

$$0 \leq y > 1.0.$$

17. A powdered long-lasting phosphor as defined in claim 14 which is a compound having the chemical composition $RO.aR'_2O_3$ (where R is one or more elements selected from the group consisting of Mg, Ca, Sr, Ba and Zn, R' is Al or B, and $0.5 \leq a \leq 3.0$ and, as an activator, Eu in an amount within a range from 0.001% to 20% in mol % to the metal element or elements represented by R and, as a co-activator, one or more elements selected from the group consisting of Ce, Pr, Nd, Sm, Tb, Dy, Ho, Er, Tm, Yb, Lu, Y and Sc in an amount within a range from 0.001% to 20% in mol % to the metal element or elements represented by R.

18. A powdered long-lasting phosphor laving a complex oxide type crystal as the base crystal and comprising an activator and a co-activator, which is a compound having a chemical composition $RO.aR'_2O_3.bR''_2O_3$ (where R is one or more elements selected from the group consisting of Mg, Ca, Sr, Ba and Zn, R' is Al or B, R" is Y or Sc, and $0.5 \leq a \leq 3.0$ and $0.001 \leq b \leq 0.02$) and, as an activator, Eu in an amount within a range from 0.001% to 20% in mol % to the metal element or elements represented by R and, as a co-activator, one or more elements selected from the group consisting of Ce, Pr, Nd, Sm, Tb, Dy, Ho, Er, Tm, Yb and Lu in an amount within a range from 0.001% to 20% in mol % to the metal element or elements represented by R, and being produced by changing a solution containing constituent elements or a mixture in the state of suspension into fine particles of liquid by atomization and thereafter heating the fine particles of liquid in a gas stream tinder an oxidating, neutral or reducing atmosphere.

19. A powdered long-lasting phosphor having a complex oxide type crystal as the base crystal and comprising an activator, which is a compound having the chemical composition $RO \cdot aR'_2O_3 \cdot bR''_2O_3$ (where R is one or more elements selected from the group consisting of Mg, Ca, Sr, Ba and Zn, R' is Al or B, R" is Y or Sc, and $0.5 \leq a \leq 3.0$ and $0.001 \leq b \leq 0.02$) and, as an activator, Eu in an amount within a range from 0.001% to 20% in mol % to the metal element or elements represented by R, and being produced by changing a solution containing constituent elements or a mixture in the state of suspension into fine particles of liquid by atomization and thereafter heating the fine particles of liquid in a gas stream under an oxidating, neutral or reducing atmosphere.

* * * * *